United States Patent
Scott

(10) Patent No.: US 9,205,880 B2
(45) Date of Patent: Dec. 8, 2015

(54) ROPS RETENTION SYSTEM FOR A WORK VEHICLE

(71) Applicant: CNH Industrial America, LLC, New Holland, PA (US)

(72) Inventor: Shane Scott, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/467,278

(22) Filed: Aug. 25, 2014

(65) Prior Publication Data

US 2015/0123390 A1 May 7, 2015

Related U.S. Application Data

(60) Provisional application No. 61/898,663, filed on Nov. 1, 2013.

(51) Int. Cl.
*B62D 33/077* (2006.01)
*B60R 21/13* (2006.01)

(52) U.S. Cl.
CPC ............ *B62D 33/077* (2013.01); *B60R 21/13* (2013.01); *B60R 21/131* (2013.01)

(58) Field of Classification Search
CPC .................... B60R 21/131; B60R 2021/0018; B60R 2021/0074; B60R 2021/0076; B60R 2021/0081; B60R 21/13; B62D 33/0617; B62D 33/067; B62D 33/077; E02F 9/163
USPC ........ 180/89.12, 89.14; 280/756; 296/187.13, 296/190.01, 190.03, 190.08, 35.1
See application file for complete search history.

(56) References Cited

U.S. PATENT DOCUMENTS

| | | | |
|---|---|---|---|
| 3,785,696 A * | 1/1974 | Moore et al. | ................... 296/102 |
| 3,841,693 A | 10/1974 | Reynolds et al. | |
| 4,053,178 A | 10/1977 | York et al. | |
| 4,294,324 A * | 10/1981 | Kimball et al. | ............ 180/89.14 |
| 5,024,283 A | 6/1991 | Deli | |
| 5,064,242 A | 11/1991 | Fujan et al. | |
| 5,209,316 A * | 5/1993 | Bauer | ........................ 180/89.14 |
| 5,388,884 A | 2/1995 | Keehner et al. | |
| 5,503,430 A | 4/1996 | Miki et al. | |
| 5,579,860 A | 12/1996 | Halverson et al. | |
| 5,890,556 A | 4/1999 | Shearn et al. | |
| 6,073,714 A | 6/2000 | McHorse et al. | |
| 6,478,102 B1 * | 11/2002 | Puterbaugh et al. | ....... 180/89.12 |
| 6,986,545 B2 | 1/2006 | Nilsson et al. | |

(Continued)

FOREIGN PATENT DOCUMENTS

EP   1092598   4/2001

*Primary Examiner* — Laura Freedman
(74) *Attorney, Agent, or Firm* — Sue C. Watson

(57) ABSTRACT

A ROPS retention system for retaining a suspended cab frame relative to a chassis frame of a work vehicle may generally include a support bracket configured to be coupled to the chassis frame. The support bracket may be positioned relative to the cab frame such that a gap is defined between the support bracket and the cab frame. The system may also include a retention stake extending outwardly from a surface of one of the cab frame or the support bracket between a base end and a tip end. The stake may be configured to be received within a collar opening defined in the other of the cab frame or the support bracket. The stake may define a stake diameter at the tip end that is less than a diameter of the collar opening. In addition, the system may include a connection strap coupled between the cab frame and the support bracket.

18 Claims, 9 Drawing Sheets

(56) References Cited

U.S. PATENT DOCUMENTS

| | | | |
|---|---|---|---|
| 7,364,223 B2 * | 4/2008 | Mori et al. | 296/190.07 |
| 7,828,371 B2 | 11/2010 | Murakami | |
| 8,240,745 B2 * | 8/2012 | Yamamoto et al. | 296/190.03 |
| 8,430,426 B2 | 4/2013 | Rasset et al. | |
| 8,807,633 B2 | 8/2014 | Milburn et al. | |
| 2006/0071499 A1 * | 4/2006 | Yoon | 296/35.1 |
| 2009/0167057 A1 | 7/2009 | Walter et al. | |
| 2012/0187721 A1 | 7/2012 | Nishimura et al. | |
| 2012/0193157 A1 * | 8/2012 | Rasset et al. | 180/89.13 |

* cited by examiner

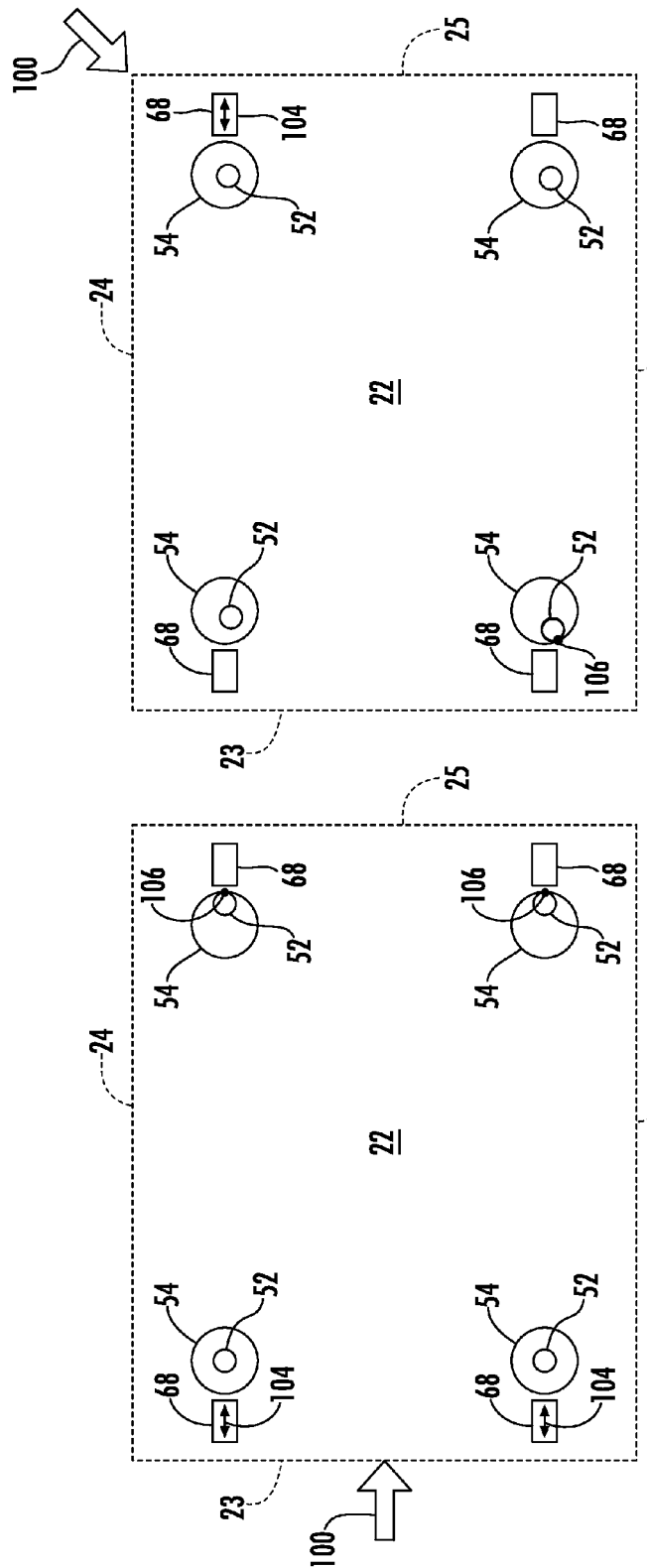

ROPS RETENTION SYSTEM FOR A WORK VEHICLE

FIELD OF THE INVENTION

The present subject matter relates generally to roll-over protection systems (ROPS) for work vehicles and, more particularly, to a ROPS retention system for retaining a fully suspended cab frame relative to a chassis frame of a work vehicle during a roll-over event.

BACKGROUND OF THE INVENTION

A wide range of off-highway, work vehicles have been developed for various purposes. In smaller work vehicles, seats and other operator supports may be sufficient, and these may be mounted on various forms of springs and other suspension components. However, in larger or more complex works vehicles, such as certain tractors and construction equipment, a partially or fully enclosed cab is more desirable, providing one or more operators with a comfortable location from which the vehicle may be operated. Such cabs, sometimes referred to as "operator environments" also provide a central location to which controls and operator interfaces may be fed, and from which most or all of the vehicle functions may be easily controlled.

Agricultural tractors and other large work vehicles are often required to provide some type of roll-over protection system (ROPS) to protect the operator in the event of a roll-over. Typically, a work vehicle with ROPS includes a cab frame coupled to the vehicle chassis via a suspension system. The suspension system is generally designed to provide for some limited movement of the cab frame relative to the chassis while still providing a suitable load transfer path between the cab frame and the chassis to accommodate roll-over loads. In addition, the cab frame, itself, typically includes a plurality of structural members coupled to one another to form a relatively stiff structural frame.

Various ROPS suspension systems have been developed for use with work vehicles. For example, U.S. application Ser. No. 13/528,655, entitled "Cab Suspension System for an Off-Road Vehicle" and filed Jun. 20, 2012, discloses a suspension system including an outer ROPS tube mounted to the cab suspension superstructure and an inner ROPS tube extending from a suspension platform of the chassis frame, with the inner ROPS tube being received within the outer ROPS tube. During a roll-over event, the outer ROPS tube is configured to be displaced relative to the inner ROPS tube until the outer ROPS tube engages or otherwise contacts the suspension platform, thereby preventing any further motion of the cab relative to the chassis frame.

While the above-described suspension system provides numerous advantages, further enhancements may still be made to improve the configuration of ROPS systems designed for use with work vehicles. Specifically, ongoing efforts seek to improve ROPS systems by reducing the cost and weight of ROPS components and/or by increasing the ease of installation of ROPS components between the cab and chassis frames.

Accordingly, an improved ROPS system that utilizes ROPS components with reduced weights and/or costs and/or that provides for a more efficient installation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a ROPS retention system for retaining a suspended cab frame relative to a chassis frame of a work vehicle. The system may generally include a support bracket configured to be coupled to the chassis frame. The support bracket may be positioned relative to the cab frame such that a gap is defined between the support bracket and the cab frame. The system may also include a retention stake extending outwardly from a surface of one of the cab frame or the support bracket between a base end and a tip end. The retention stake may be configured to be received within a collar opening defined in the other of the cab frame or the support bracket. The retention stake may define a stake diameter at the tip end that is less than a diameter of the collar opening. In addition, the system may include a connection strap coupled between the cab frame and the support bracket.

In another aspect, the present subject matter is directed to a work vehicle including a chassis frame and a cab frame configured to be fully suspended relative the chassis frame during normal operation of the work vehicle. The work vehicle may also include a ROPS retention system for retaining the cab frame relative to the chassis frame. The system may include a plurality of support brackets coupled to the chassis frame. The support brackets may be positioned relative to the cab frame such that a gap is defined between each support bracket and the cab frame. The system may also include a plurality of retention stakes. Each retention stake may extend outwardly from a surface of the cab frame or one of the support brackets between a base end and a tip end. In addition, each retention stake may be configured to be received within a corresponding collar opening defined in the other of the cab frame or the one of the support brackets. Moreover, the system may include a plurality of connection straps. Each connection strap may be coupled between the cab frame and one of the support brackets. When a roll-over load is applied to the cab frame, the cab frame may be configured to be displaced relative to the cab chassis until at least one retention stake is engaged against an outer perimeter of its corresponding collar opening at an engagement point.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a schematic, top view of the operation of the system shown in FIG. 9; during the roll-over event; and FIG. 11 illustrates a schematic, side view of the operation of the system shown in FIG. 8 during another roll-over event, particularly illustrating a roll-over load being applied at one of the corners of the cab frame.

DETAILED DESCRIPTION OF THE INVENTION

Figure 1:
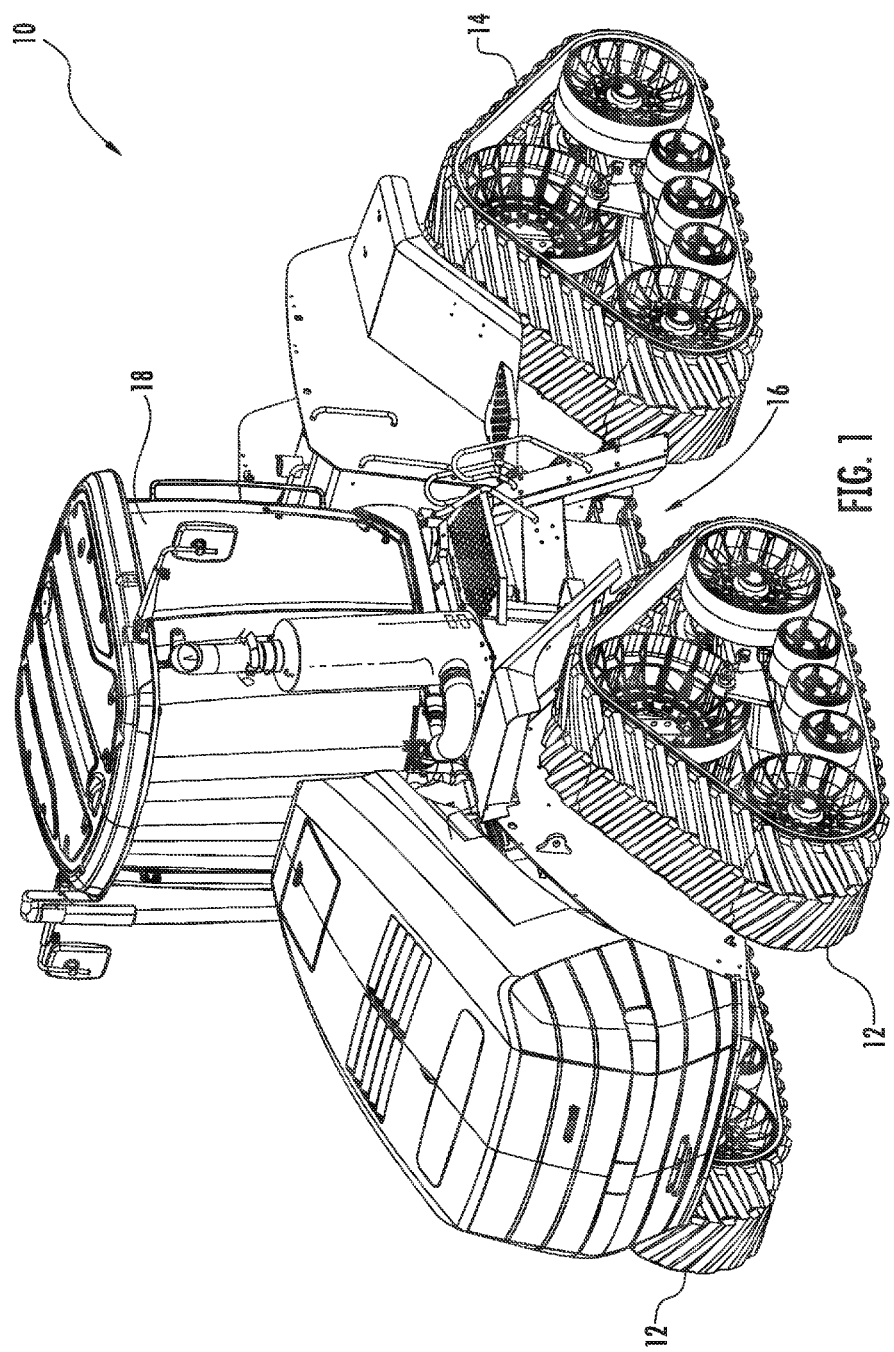
FIG. 1 illustrates a perspective view of one embodiment of a work vehicle.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a ROPS retention system for retaining a cab frame relative to a chassis frame of a work vehicle, such as a tractor, combine, construction vehicle and/or any other suitable off-road vehicle. As will be described below, the disclosed system generally utilizes a stake/collar configuration together with connection straps to provide for improved retention of the cab frame relative to the cab chassis. Specifically, in several embodiments, the cab frame may be suspended relative to a plurality of support brackets mounted to and extending upwardly from the chassis frame. Additionally, a plurality of retention stakes may be configured to extend outwardly from either the cab frame or the support brackets so as to be received within corresponding collar openings formed in the other of the cab frame or the support brackets. For example, if the retention stakes extend outwardly from a bottom portion of the cab frame, the stakes may be configured to be received within corresponding collar openings defined through a top portion of each of the support brackets. Moreover, the system may also include a plurality of connection straps coupled between the cab frame and the support brackets at a location generally adjacent to the location of the stakes/collars.

It should be appreciated that the various ROPS components described herein (e.g., the retention stakes, the connection straps, etc.) generally have lower weights and are substantially less expensive than ROPS components included within conventional ROPS systems. In addition, due to the configuration of the ROPS components, the disclosed system may be easily and efficiency installed onto and/or between the cab and chassis frames of a work vehicle. Specifically, as will be described below, with the support brackets installed onto the chassis frame, the cab frame may be simply lowered into position above the chassis frame.

It should also be appreciated that, in general, the disclosed system will be described with reference to its performance during a roll-over event for a work vehicle. As is generally understood, due to the significant weight of work vehicles, roll-over events typically result in large roll-over loads being transmitted through the vehicle's cab frame, chassis and/or other structural components. For instance, when a work vehicle rolls over in a manner the causes the operator's cab to contact the ground, a reactive load (generally proportional to the weight of the vehicle and the angle of the vehicle relative to the ground) is typically applied through the vehicle's cab frame.

In accordance with aspects of the present subject matter, the disclosed system may be configured to retain the cab frame relative to the chassis frame during a roll-over event, thereby allowing the roll-over load(s) to be transmitted through and absorbed by portions of both frames. Specifically, the roll-over load(s) may tend to cause the fully suspended cab frame to be displaced laterally and/or vertically relative to the chassis frame. As will be described below, the stake/collar arrangement of the disclosed system may be configured to limit lateral displacement of the cab frame relative to the chassis frame. For example, in several embodiments, the retention stake(s) located on the side of the cab frame opposite the side along which the roll-over load is being applied may be configured to engage the side surface(s) of the corresponding collar opening(s), thereby restricting further lateral movement, of the cab frame relative to the chassis frame. Moreover, when the roll-over load is applied, one or more of the connection straps may become loaded (i.e., by being fully tensioned), thereby limiting the vertical displacement of the cab frame relative to the chassis frame. As a result, after the limited amount of displacement provided by the disclosed system, the cab frame may be retained relative to the chassis frame so that the roll-over load may be transmitted through and absorbed by the various components of the work vehicle.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front tracks 12, a pair of rear tracks 14 and a chassis 16 coupled to and supported by the tracks 12, 14. As is generally understood, the work vehicle 10 may also include an engine and a transmission (not shown) supported by the chassis 16, which may be used to rotationally drive the front tracks 12 and/or the rear tracks 14. Additionally, an operator's cab 18 may be supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include tires in lieu of tracks 12, 14 or may include a combination of tires and tracks.

Figure 2:
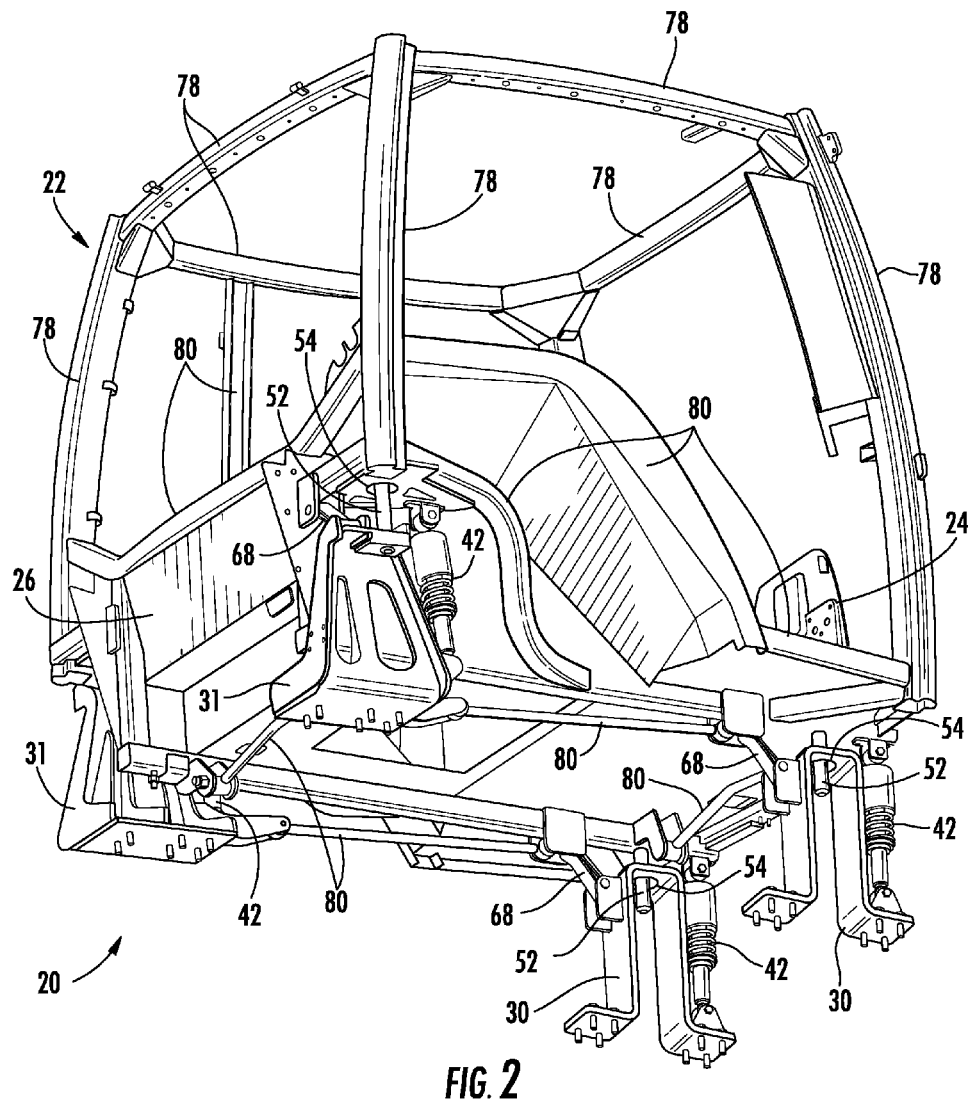
FIG. 2 illustrates a perspective view of one embodiment of a ROPS retention system suitable for use with the work vehicle shown in FIG. 1 in accordance with aspects of the present subject matter, particularly illustrating components of the system 20 positioned relative to a cab frame of the work vehicle.
Figure 3:
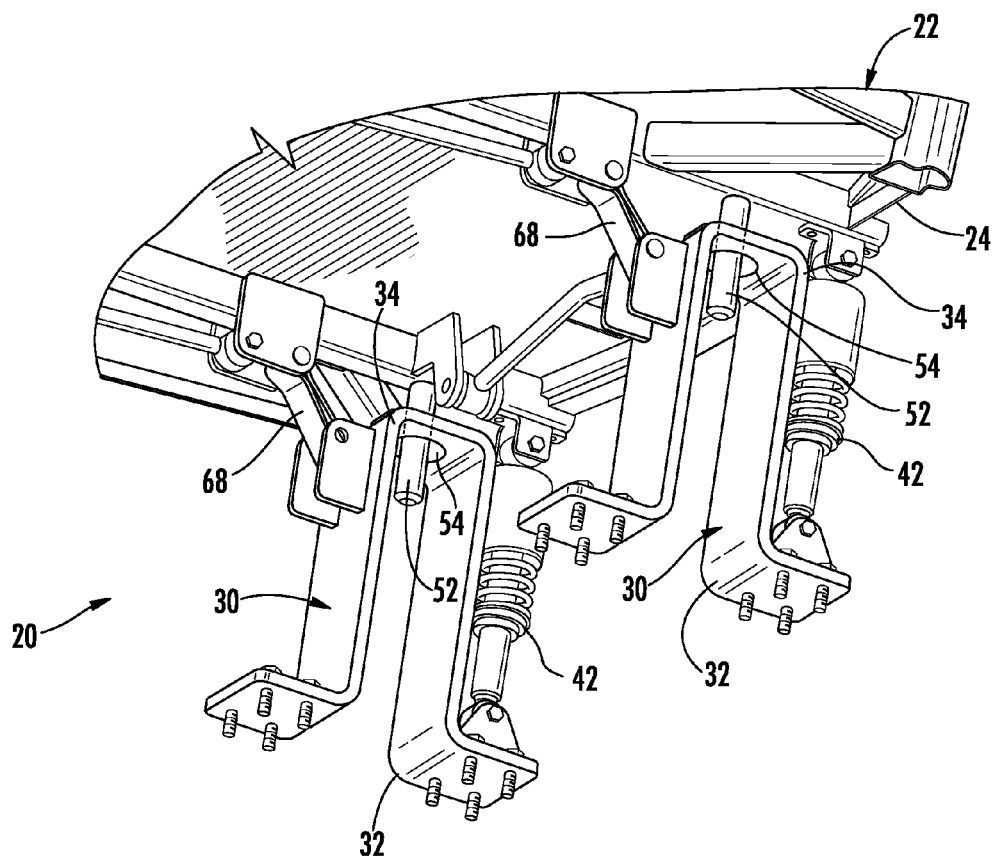
FIG. 3 illustrates a bottom perspective view of a portion of the system and cab frame shown in FIG. 2, particularly illustrating various components of the system positioned at a front side of the cab frame.
Figure 4:
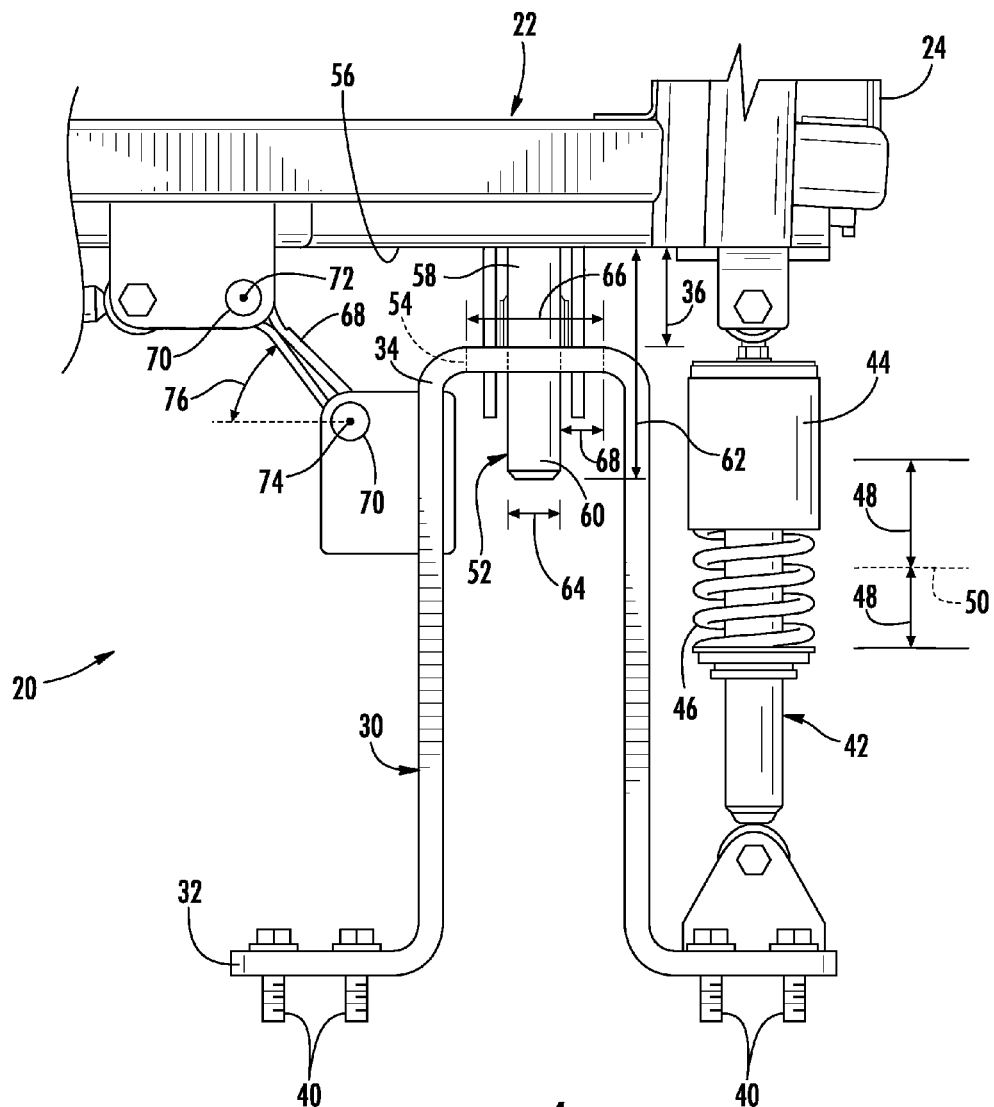
FIG. 4 illustrates a side view of a portion of the components and cab frame shown in FIG. 3.
Figure 5:
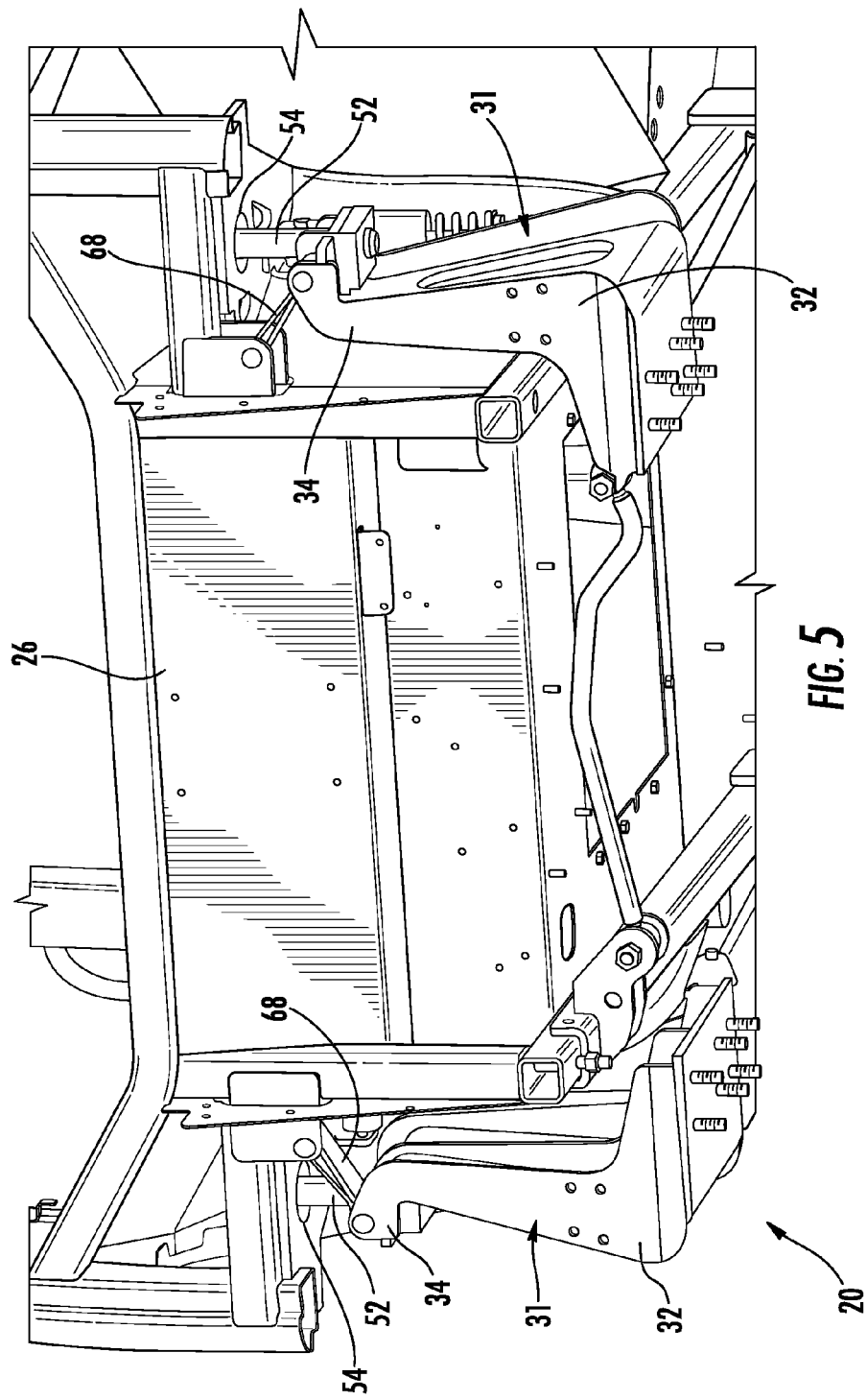
FIG. 5 illustrates a rear perspective view of a portion of the system and cab frame shown in FIG. 2, particularly illustrating various components of the system positioned at a rear side of the cab frame.
Figure 6:
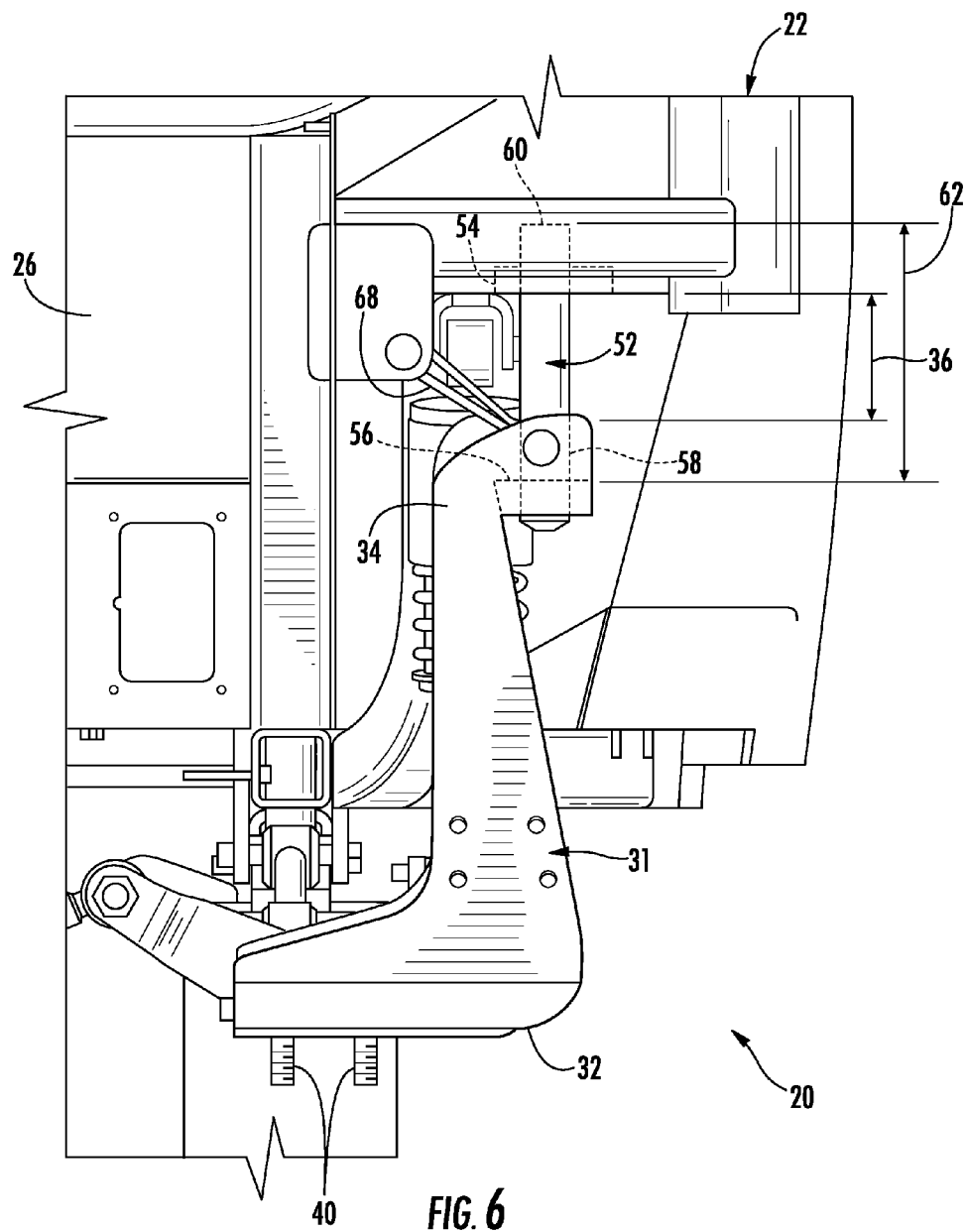
FIG. 6 illustrates a side view of a portion of the components and cab frame shown in FIG. 5.
Figure 7:
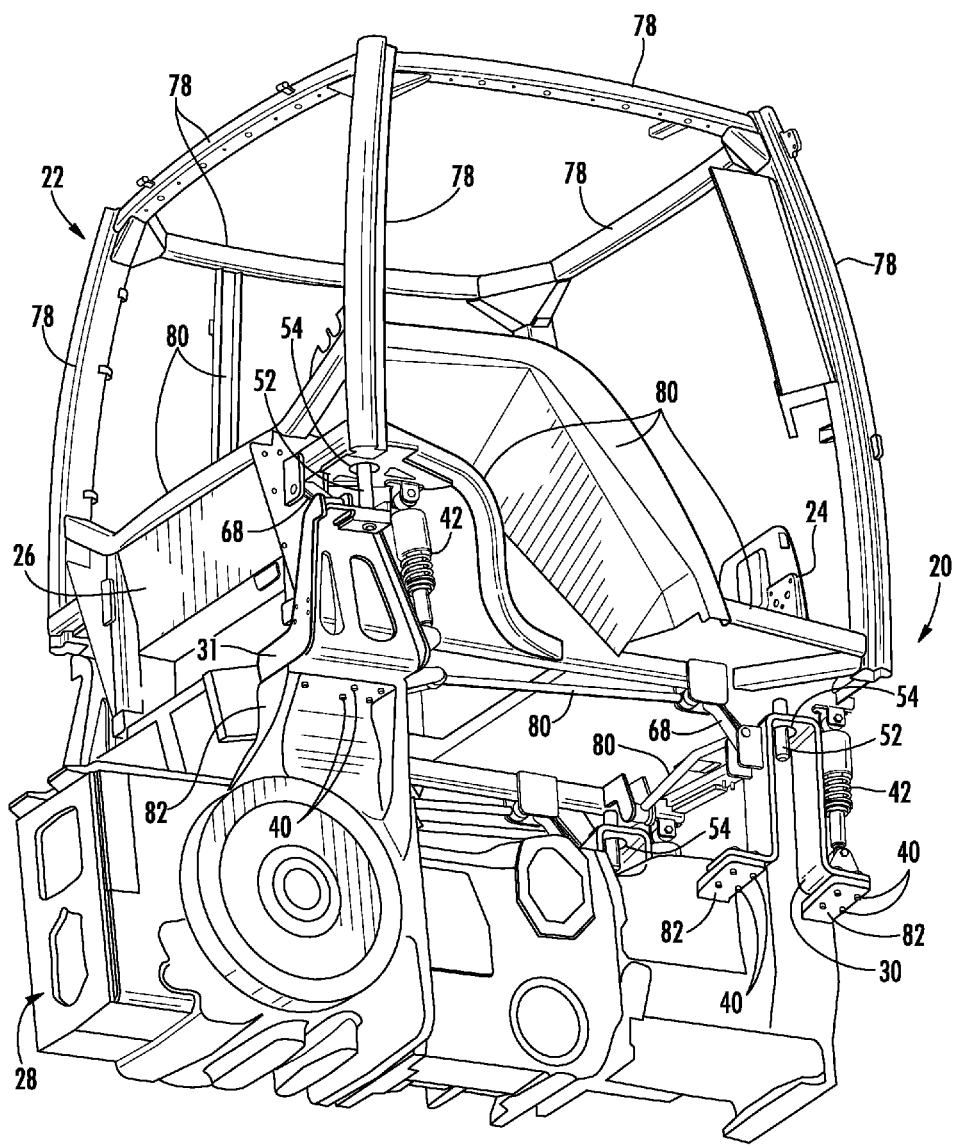
FIG. 7 illustrates a perspective view of the system and cab frame shown in FIG. 2 installed onto a corresponding chassis frame of the work vehicle shown in FIG. 1.

Referring now to FIGS. 2-7, several views of one embodiment of a ROPS retention system 20 suitable for use with the work vehicle 10 shown in FIG. 1 are illustrated in accordance with aspects of the present subject matter. Specifically, FIG. 2 illustrates a perspective view of the system 20 positioned relative to a cab frame 22 of the operator's cab 18. FIG. 3 illustrates a bottom perspective view of a portion of the system 20 and cab frame 22 shown in FIG. 2, particularly illustrating various components of the system 20 positioned at a front side 24 of the cab frame 22, while FIG. 4 illustrates a side view of a portion of the components and cab frame 22 shown in FIG. 3. Additionally, FIG. 5 illustrates a rear perspective view of a portion of the system 20 and cab frame 22 shown in FIG. 2, particularly illustrating various components of the system 20 positioned at a rear side 26 of the cab frame 22, while FIG. 6 illustrates a side view of a portion of the components and cab frame 22 shown in FIG. 5. Moreover, FIG. 7 illustrates a perspective view of the system 20 and cab frame 22 shown in FIG. 2 installed onto a corresponding chassis frame 28.

In general, the disclosed system 20 may be configured for retaining a cab frame 22 of the operator's cab 20 relative to a chassis frame 28 (FIG. 7) of the vehicle's chassis 16. As will be described below, in several embodiments, the cab frame 22 may be configured to be fully suspended above the chassis frame 16 during normal operation of the work vehicle 10. Accordingly, the disclosed system 20 may be designed to allow for sufficient movement of the cab frame 22 relative to the chassis frame 28 during normal operation while still maintaining a connection between the cab frame 22 with the chassis frame 28 during a roll-over event, thereby providing a suitable load transfer path between the frames 22, 28 to accommodate roll-over loads.

As shown in the illustrated embodiment, the system 20 may include a plurality of support brackets 30, 31 configured to extend vertically between portions of the cab frame 22 and the chassis frame 28. Specifically, the system 20 includes a pair of front brackets 30 configured to be positioned below a portion of the cab frame 22 along its front side 24 and a pair of rear brackets 31 configured to be positioned below a portion of the cab frame 22 along its rear side 26. As shown in FIGS. 3-6, each support bracket 30, 31 may extend lengthwise between a lower portion 32 and an upper portion 34, with the lower portion 32 of each bracket 30 being configured to be mounted to the chassis frame 28 (as shown in FIG. 7) and the upper portion 34 of each bracket 30, 31 being configured to extend vertically from the lower portion 32 to a position adjacent to the cab frame 22. As indicated above, in several embodiments, the cab frame 22 may be configured to be fully suspended above the chassis frame 28. Thus, as particularly shown in FIGS. 4 and 6, during normal operation of the work vehicle, a gap 36 may be defined between the upper portion 34 of each support bracket 30, 31 and the cab frame 22.

It should be appreciated that the support brackets 30, 31 may generally have any suitable configuration that allows the brackets 30 to function as described herein. For example, as shown in the illustrated embodiment, the support brackets 30 located along the front side 24 of the cab frame 22 generally have a "U-shaped" configuration while the support brackets 31 located along the rear side 26 of the frame 22 generally have an "L-shaped" configuration. However, in other embodiments, the support brackets 30, 31 may define any other suitable shape and/or may have any other suitable configuration.

It should also be appreciated that the support brackets 30, 31 may be configured to be coupled to the chassis frame 28 using any suitable attachment means know in the art. For example, as shown in FIGS. 4 and 6, in several embodiments, a plurality of bolts 40 or other suitable fasteners may be configured to extend through the lower portion 32 of each support bracket 30, 31 for mounting the brackets 30, 31 to the chassis frame 28. However, in other embodiments, the support brackets 30, 31 may be coupled to the chassis frame 28 using any other suitable means, such as by welding the brackets 30 to the frame 28.

Additionally, to maintain the cab frame 22 suspended above the support brackets 30, 31, the system 20 may include a plurality of damper struts 42 coupled between the cab frame 22 and the chassis frame 28. For example, as shown in FIG. 2, in several embodiments, the damper struts 42 may be coupled directly between the support brackets 30, 31 (e.g., at the lower portion 32 of each bracket 30) and the cab frame 22 at each corner of the frame 22. However, in other embodiments, the damper struts 42 may be configured to be coupled between the cab frame 22 and any other suitable component of the chassis frame 28. Regardless, the damper struts 42 may generally be configured to support the cab frame 22 above the support brackets 30, 31 (and, thus, above the chassis frame 28) during normal operation of the work vehicle 10.

In general, the damper struts 42 may have any suitable configuration that allows the struts 42 to function as described herein. For example, in several embodiments, the damper struts 42 may be configured as coil-over shock absorbers. Thus, as particularly shown in FIG. 4, each damper strut 42 may include a shock absorber 44 with a coil spring 46 extending around a portion of the absorber 44. However, in other embodiments, the struts 42 may be configured similar to any other suitable damping mechanism.

As is generally understood, the damper struts 42 may be configured to allow for a given amount of displacement between the cab frame 22 and the chassis frame 28 during normal operation of the work vehicle 10. For example, as shown in FIG. 4, each damper strut 42 may have a pre-defined stroke that provides for a maximum travel distance 48 of the cab frame 22 both upwards and downwards relative to an equilibrium position 50 of the strut 42 (i.e., the position of a given reference point along the strut 42 when no other forces besides the weight of the operator's cab 18 is being applied through the strut 42). Thus, as the cab frame 22 is subjected to loading during normal operation, the cab frame 22 may be displaced vertically relative to the chassis frame 28 in either direction up to the maximum travel distance 48. However, during a roll-over event, the damper struts 42 may not be capable of supporting the extreme loads applied through the frame 22. As a result, the disclosed system 20 may include various ROPS components for retaining the cab frame 22 both vertically and laterally relative to the chassis frame 28 during roll-over events.

Specifically, as shown in the illustrated embodiment, the system 20 may include a plurality of elongated retention stakes 52 extending between the cab frame 22 and the support brackets 30, 31, with each stake 52 being configured to be received within a corresponding collar opening 54 formed in the cab frame 22 and/or support brackets 30, 31. As will be described below, the stake/collar configuration may allow the cab frame 22 to be engaged with the support brackets 30, 31 during a roll-over event, thereby limiting the lateral displacement of the cab frame 22 relative to the chassis frame 28.

In several embodiments, one or more of the retention stakes 52 may be configured to be coupled to or formed integrally with the cab frame 22 such that the stake(s) 52 extend downwardly from the frame 22 and are received within a corresponding collar opening(s) 54 formed in the support bracket(s) 30, 31. For example, as shown in FIGS. 3 and 5, the retention stakes 52 positioned at the corners along the front side 24 of the cab frame 22 may extend downward from the frame 22 so as to be received within corresponding collar openings 54 defined through the top portion 34 of the front support brackets 31. Alternatively, one or more of the retention stakes 52 may be configured to be coupled to or formed integrally within the support brackets 30, 31 such that the stake(s) extend upwardly from the support bracket(s) 30, 31 and received within a corresponding collar opening(s) 54 formed in the cab frame 22. For example, as shown in FIGS. 5 and 6, the retention stakes 52 positioned at the corners along the rear side 26 of the cab frame 22 may extend upward from the top portion 34 of each of the rear support brackets 31 so as to be received within corresponding collar openings 54 defined through a portion of the cab frame 22.

It should be appreciated that the differing stake/collar configurations shown for the front and rear sides 24, 26 of the cab frame 22 are simple illustrated to show two different embodiments of the present subject matter. In another embodiment, one or both of the retention stakes 52 disposed along the front side 24 of the cab frame 22 may be configured to extend upwardly from the front support brackets 30 while one or both retention stakes 52 disposed along the rear side 26 of the cab frame 22 may be configured to extend downwardly from the cab frame 22. In still further embodiments, all of the retention stakes 52 may be configured to extend outwardly from one of the cab frame 22 or the support brackets 30, 31, with the corresponding collar openings 54 being defined in the other component (i.e., the cab frame 22 or the support brackets 30, 31).

As particularly shown in FIGS. 4 and 6, each stake 52 may generally be configured to extend outwardly from a surface 56 of either a portion of the cab frame 22 or the upper portion 34 of the support brackets 30, 31 between a base end 58 and a tip end 60, with a stake length 62 being define between the base and tips ends 58, 60. In general, each retention stake 52 may be configured to define any suitable stake length 62 between its base and tips ends 58, 60.

Additionally, as shown in FIG. 4, each retention stake may define a stake diameter 64 that is less than a collar diameter defined by the corresponding collar opening 54. As a result, a clearance gap 68 may be defined between the outer circumference of each stake 52 and an inner perimeter of each collar opening 54. Moreover, in several embodiments, the stake diameter 64 defined at the tip end 60 of each retention stake 52 may be configured to be less than the collar diameter 66. For example, as shown in the illustrated embodiment, each retention stake 52 defines a constant diameter between its base and tip ends 58, 60 such that the stake diameter 64 is less than the collar diameter 66 along the entire length 62 of the stake 52. In other embodiments, the stake diameter 64 may be varied along the length 62 of each retention stake 54 as long as the diameter 64 at the tip end 60 is not greater than corresponding collar diameter 66. By configuring the tip end 60 of each retention stake 52 to be dimensionally smaller than the collar opening 54, the cab frame 22 may be configured to be lowered onto the chassis frame 28 by simply aligning each stake 52 with it corresponding collar opening 54, which may significantly reduce the overall amount of time required to install the cab frame 22 onto the chassis frame 28.

Referring still to FIGS. 2-6, in several embodiments, the system 20 may also include a plurality of connection straps 68 coupled between the cab frame 22 and each support bracket 30, 31, in general, the connection straps 68 may be configured to limit the vertical displacement of the cab frame 22 relative to the chassis frame 28. In particular, as will be described below, one or more of the connection straps 68 may be configured to become tensioned during a roll-over event in order to limit the vertical displacement of the cab frame 22 in a manner that maintains at least one of the retention stakes 52 engaged against the inner perimeter of its corresponding collar opening 54.

The connection straps 68 may generally be configured to be coupled between the cab frame 22 and the support brackets 30, 31 using any suitable attachment means known in the art. For example, as shown in FIG. 4, in several embodiments, each connection strap 68 may be configured to be coupled around suitable fasteners 70 (e.g., bolts, pins, etc.) extending through a portion of the cab frame 22 at a first attachment location 72 and through a portion of each support bracket 30, 31 at a second attachment location 74. However, in alternative embodiments, the connection straps 68 may be coupled between the cab frame 22 and the support brackets 30, 31 using any other suitable attachment means.

Additionally, as shown in FIG. 4, when the connection straps 68 are unloaded (i.e., not in tension), each strap 68 may be configured to extend between the first and second attachment locations 72, 74 at a strap angle 76 defined relative to a horizontal reference line or plane. In several embodiments, the nominal (initial) strap angle 76 may generally range from about −60 degrees to about 90 degrees, such as from about 0 degrees to about 90 degrees or from about 45 degrees to about 80 degrees or any other subranges therebetween. In a particular embodiment of the present subject matter, the strap angle 76 may be substantially equal to 90 degrees such that each connection strap 68 extends substantially vertically between the first and second attachment locations 72, 74.

Moreover, in several embodiments, the connection straps 68 may be configured to be formed from any suitable high-strength material that permits the straps 68 to limit the vertical displacement of the cab frame 22 relative to the chassis frame 28 during a roll over event. For instance, in one embodiment, the connection straps 68 may be formed from a high strength, elastic material, such as polyester. As a result, the connection straps 68 may function similar to stiff springs and, thus, may stretch and/or deform slightly when in tension.

It should be appreciated that the disclosed system 20 may generally be configured to be utilized with a cab frame 22 having any suitable configuration. However, in general, the cab frame 22 may include a plurality of structural members 78, 80 configured to be coupled together to form a structural frame. For example, as shown in FIG. 2, the cab frame 22 may include a plurality of primary structural members 78 generally configured to form the base shape or structure of the frame 22 (e.g., a generally rectangular or box shape). In addition, the cab frame 18 may include a plurality of secondary structural members 80 coupled between the primary structural members 78 to add stiffness and rigidity to the frame 22.

It should also be appreciated that the disclosed system 20 may also be configured to be utilized with a chassis frame 28 having any suitable configuration. However, in general, the chassis frame 28 may include one or more mounting platforms 82 (FIG. 7) and/or other mounting locations/surfaces configured for mounting the support brackets 30, 31 to the frame 28. For example, as shown in FIG. 7, the support brackets 30, 31 may be mounted to the mounting platforms 82 via the fasteners 40 extending from the lower portion 32 of each support bracket 30, 31.

Figure 8:
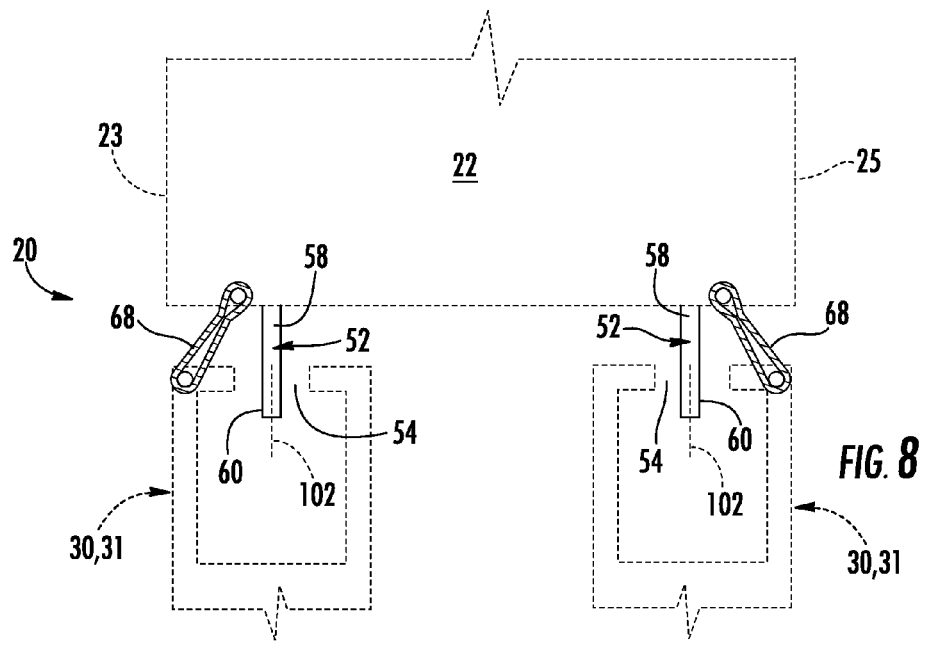
FIG. 8 illustrates a schematic, side view of one embodiment of the operation of the disclosed system during normal operation of the work vehicle.
Figure 9:
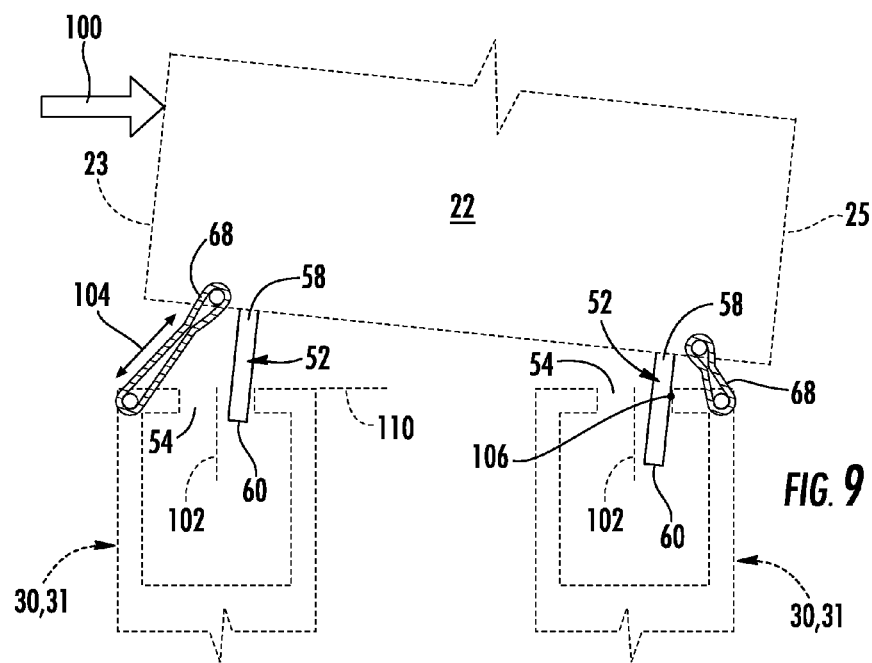
FIG. 9 illustrates a schematic, side view of the operation of the system shown in FIG. 8 during a roll-over event, particularly illustrating a roll-over load being applied at one of the sides of the cab frame.

The operation of the disclosed system 20 during a roll-over event will now be described with reference to FIGS. 8-11, which provide simplified, schematic views of the stake/collar arrangement defined between the support brackets 30, 31 and the cab frame 22 as well the connection between such components provided by the connection straps 69. Specifically, FIG. 8 illustrates a schematic, side view of the disclosed system 20 during normal operation of the work vehicle 10. Additionally, FIGS. 9 and 10 illustrate schematic side and top views, respectively, of the disclosed system 20 during a roll-over event in which a large, roll-over force (indicated by arrow) is applied to one of the sides of the cab frame 22.

As shown in FIG. 8, during normal operation of the work vehicle 10, the retention stakes 52 (shown in the illustrated embodiment as extending from the cab frame 22) may generally be configured to be positioned substantially at the center of each collar opening 54 (e.g., so as to extend along a central axis 102 of each collar opening 54). Additionally, each connection strap 68 may be unloaded or otherwise in a non-tensioned state. As indicated above, in such instance, the weight of the fully suspended cab frame 22 may generally be supported by the damper struts 42 (FIG. 2) extending between the cab frame 22 and the chassis frame 28.

However, upon the occurrence of a roll-over event, a substantial roll-over load 100 may be applied against the cab frame 22 that results in displacement of the cab frame 22 relative to the chassis frame 28. For instance, in the example shown in FIGS. 9 and 10, the work vehicle 10 has rolled over such that a roll-over load 100 is being applied to a left side 23 of the cab frame 22. As a result, the cab frame 22 may be displaced laterally relative to the chassis frame 22 until the retention stake(s) 52 disposed on the opposite side of the frame 22 are in contact with and engaged against the outer perimeter of the corresponding collar openings 54. For example, as shown in FIGS. 9 and 10, in the illustrated embodiment, the retention stakes 52 disposed along a right side 25 of the cab frame 22 may be displaced laterally relative to the support brackets 30, 31 such that the stakes 51 contact the outer perimeter of the right-side collar openings 54 (i.e., at engagement points 106).

Additionally, when such retention stake(s) 52 are engaged against the outer perimeter of the collar openings 54, the cab frame 22 may begin, to rotate about a rotational axis defined at the engagement points 106 defined between the stake(s) 52 and the edge or side surface of openings 54, thereby causing the bottom portion of the cab frame 22 located furthest away from the rotational axis to be displaced vertically away from the support brackets 30, 31. Such rotation of the cab frame 22 may then be limited by the connection strap(s) 68 coupled to the portion of the frame 22 that is moving away from the chassis frame 28. For example, as shown in FIGS. 9 and 10, the connection straps 52 located along the left side 23 of the cab frame 22 may be loaded or otherwise fully tensioned (as indicated by arrows 104), thereby preventing further rotation of the cab frame 22 and, thus, maintaining the right-side retention stakes 52 engaged against the outer perimeter of the corresponding collar openings 54 at the engagement points 106.

It should be appreciated that, in several embodiments, each connection strap 68 may be configured such that it is only loaded or in tension once the maximum travel distance 48 (FIG. 4) for the cab frame 22 provided by the damper struts 42 is exceeded. For example, in the illustrated embodiment, the damper struts 42 located on the left side 23 of the cab frame 22 may not be loaded until the cab frame 22 has been displaced vertically upward relative to the support brackets 30, 31 beyond the maximum travels distance 48 provided by such damper struts 42. As a result, the straps 68 may not serve to limit the motion of the cab frame 22 during normal vehicle operation when the vertical displacement of the cab frame 22 is limited to a distance less than the maximum travel distance 48 provided by the struts 42.

It should also be appreciated that, in several embodiments, the lengths 62 (FIG. 4) of the retention stakes 52 may be selected such that at least a portion of each stake 52 is maintained within its corresponding collar opening 54 during a roll-over event. For example, as particularly shown in FIG. 9, when the left-side connection straps 68 are fully tensioned, the tip end 60 of each of the left-side stakes 52 may still be located below a reference line or plane defined at the top of the collar openings 54.

A similar result may also occur when the roll-over load 100 is applied at one of the corners of the cab frame 22. For instance, FIG. 11 illustrates an example in which the work vehicle 10 has rolled over in a manner that caused a roll-over load 100 to be applied at an angle against the rear, right corner of the cab frame 22. As shown, due to the application of the load 100, the cab frame 22 may be displaced laterally such that the retention stake 52 located furthest from the application point (i.e., the stake 52 located in the front, left corner of the cab frame 22) is engaged against the outer perimeter of its corresponding collar opening 54 (i.e., at engagement point 106). Thereafter, the cab frame 22 may begin to rotate about the rotational axis defined at the engagement point 106, thereby causing the connection strap 68 located furthest away from the rotational axis (i.e., the strap 68 located in the rear, right corner of the cab frame 22 closest to the application of the roll-over load 100) to be loaded or otherwise fully tensioned (as indicated by arrow 104). Accordingly, the tensioned connection strap 68 may prevent further rotation of the cab frame 22 relative to the chassis frame 28 while maintaining the opposite retention stake 52 engaged with against the outer perimeter of its collar opening 54 at the engagement point 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A roll-over protection system (ROPS) retention system for retaining a suspended cab frame relative to a chassis frame of a work vehicle, the retention system comprising:
    a support bracket configured to be coupled to the chassis frame, the support bracket being positioned relative to the cab frame such that a gap is defined between the support bracket and the cab frame;
    a retention stake extending outwardly from a surface of one of the cab frame or the support bracket between a base end and a tip end, the retention stake being configured to be received within a collar opening defined in the other of the cab frame or the support bracket, the retention stake defining a stake diameter at the tip end that is less than a diameter of the collar opening; and
    a connection strap coupled between the cab frame and the support bracket, wherein when the cab frame is displaced laterally relative to the chassis frame, the retention stake is configured to engage an outer perimeter of the collar opening to limit further lateral displacement of the cab frame.

2. The ROPS retention system of claim 1, wherein, when the cab frame is displaced vertically away from the chassis frame, the connection strap is configured to become tensioned so as to limit further vertical displacement of the cab frame.

3. The ROPS retention system of claim 2, wherein the connection strap is formed from a high strength elastic material.

4. The ROPS retention system of claim 1, wherein the retention stake extends outwardly from a bottom portion of the cab frame, the collar opening being defined through a top portion of the support bracket.

5. The ROPS retention system of claim 1, wherein the retention stake extends outwardly from a top portion of the support bracket, the collar opening being defined through a bottom portion of the cab frame.

6. The ROPS retention system of claim 5, wherein the stake diameter is substantially constant along a length of the stake defined between the base and tip ends.

7. A roll-over protection system (ROPS) retention system for retaining a suspended cab frame relative to a chassis frame of a work vehicle, the retention system comprising:
- a support bracket configured to be coupled to the chassis frame, the support bracket being positioned relative to the cab frame such that a gap is defined between the support bracket and the cab frame;
- a retention stake extending outwardly from a surface of one of the cab frame or the support bracket between a base end and a tip end, the retention stake being configured to be received within a collar opening defined in the other of the cab frame or the support bracket, the retention stake defining a stake diameter at the tip end that is less than a diameter of the collar opening; and
- a connection strap coupled between the cab frame and the support bracket, and further comprising a strut coupled between the cab frame and the support bracket, the strut providing for a maximum travel distance of the cab frame relative to the chassis frame during normal operation of the work vehicle, wherein the connection strap is configured to become tensioned only after the cab frame has been vertically displaced relative to the chassis frame beyond the maximum travel distance.

8. A work vehicle, comprising:
- a chassis frame;
- a cab frame configured to be fully suspended relative the chassis frame during normal operation; and
- a roll-over protection system (ROPS) retention system for retaining the cab frame relative to the chassis frame, the ROPS retention system comprising:
  - a plurality of support brackets coupled to the chassis frame, the support brackets being positioned relative to the cab frame such that a gap is defined between each support bracket and the cab frame;
  - a plurality of retention stakes, each retention stake extending outwardly from a surface of the cab frame or one of the support brackets between a base end and a tip end, each retention stake being configured to be received within a corresponding collar opening defined in the other of the cab frame or the one of the support brackets; and
  - a plurality of connection straps, each connection strap being coupled between the cab frame and one of the support brackets, wherein, when a roll-over load is applied to the cab frame, the cab frame is configured to be displaced relative to the cab chassis until at least one retention stake of the plurality of retention stakes is engaged against an outer perimeter of its corresponding collar opening at an engagement point.

9. The work vehicle of claim 8, wherein, when the at least one retention stake is engaged against the outer perimeter of its corresponding collar opening at the engagement point, the cab frame is configured to rotate about the engagement point such that a portion on the cab frame is vertically displaced away from the chassis frame.

10. The work vehicle of claim 9, wherein, when the portion of the cab frame is vertically displaced away from the chassis frame, at least one connection strap of the plurality of connection straps is configured to become tensioned so as to limit further vertical displacement of the cab frame.

11. The work vehicle of claim 10, wherein the at least one connection strap is located on an opposite side of the cab frame relative to the at least one retention stake.

12. The work vehicle of claim 10, further comprising a plurality of struts, each strut being coupled between the cab frame and one of the plurality of support brackets, each strut providing for a maximum travel distance of the cab frame relative to the chassis frame during normal operation of the work vehicle.

13. The work vehicle of claim 12, wherein the at least one connection strap is configured to become tensioned only after the cab frame has been vertically displaced relative to the chassis frame beyond the maximum travel distance.

14. The work vehicle of claim 8, wherein at least one of the plurality of retention stakes extends outwardly from a bottom portion of the cab frame.

15. The work vehicle of claim 8, wherein at least one of the plurality of retention stakes extends outwardly from a top portion of the support bracket.

16. The work vehicle of claim 8, wherein each retention stake defines a stake diameter at the tip end that is less than a diameter of its corresponding collar opening.

17. The work vehicle of claim 16, wherein the stake diameter is substantially constant along a length defined between the base and tip ends.

18. The work vehicle of claim 8, wherein each connection strap is formed from a high strength elastic material.

* * * * *